Sept. 22, 1931. G. MECHETTI 1,823,950
AUTOMATIC AUTOMOBILE CONTROL
Filed Jan. 31, 1930 3 Sheets-Sheet 1
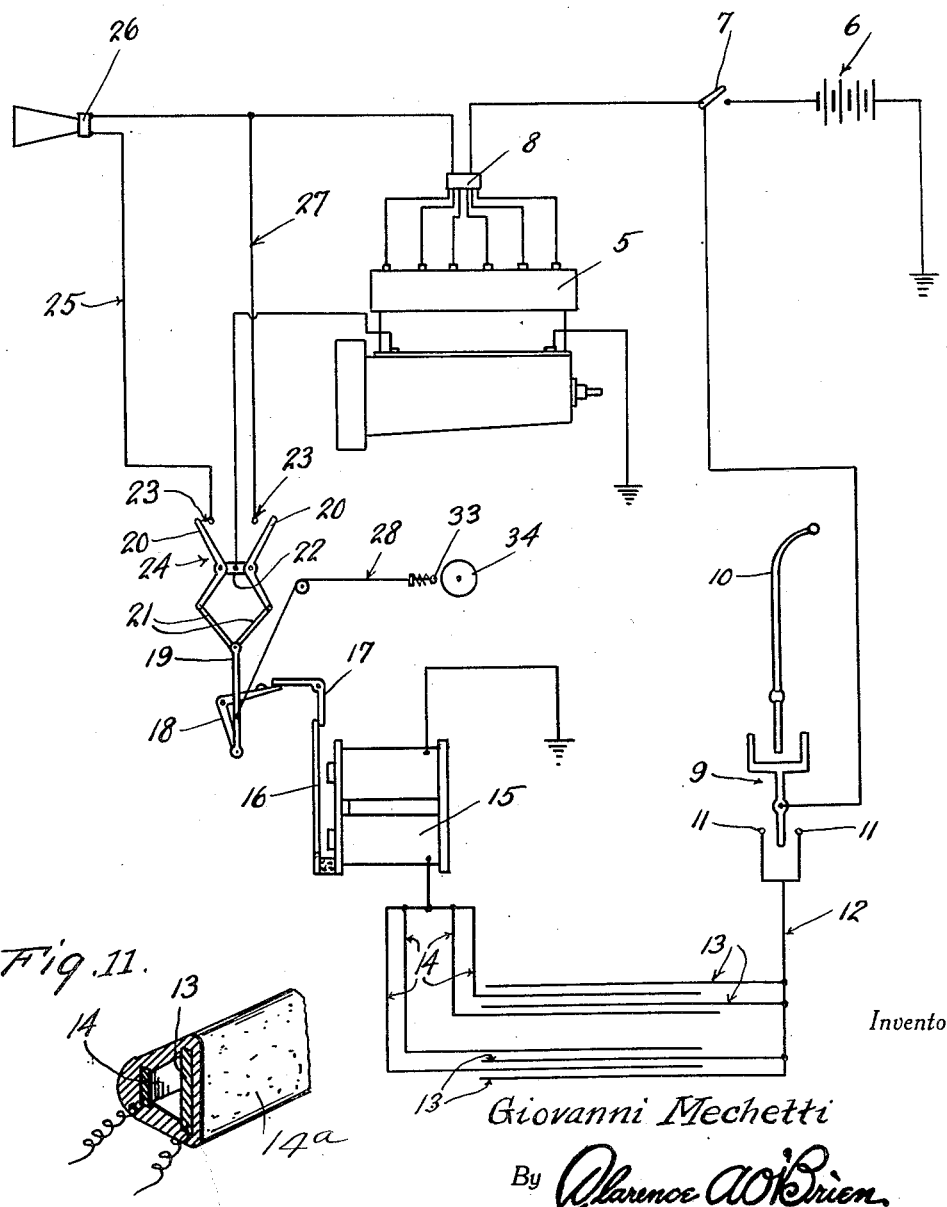
Inventor
Giovanni Mechetti
By Clarence A. O'Brien
Attorney Sept. 22, 1931.     G. MECHETTI     1,823,950
AUTOMATIC AUTOMOBILE CONTROL
Filed Jan. 31, 1930     3 Sheets-Sheet 2
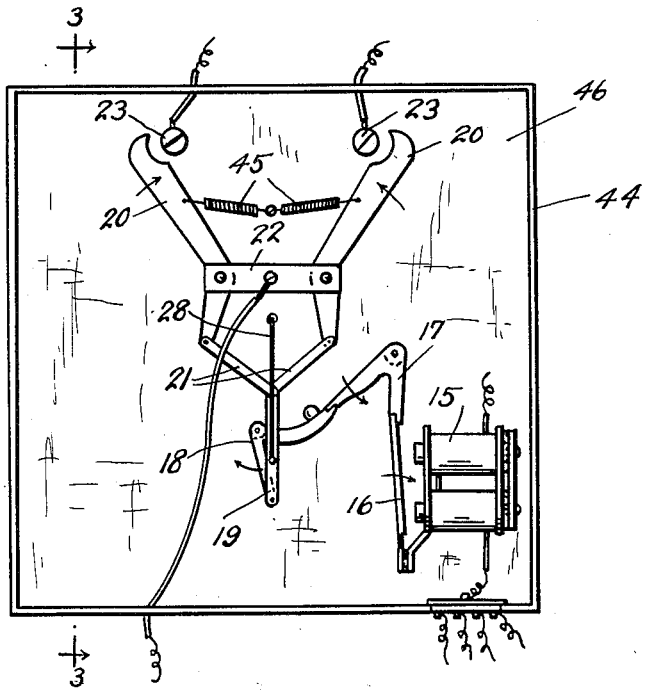
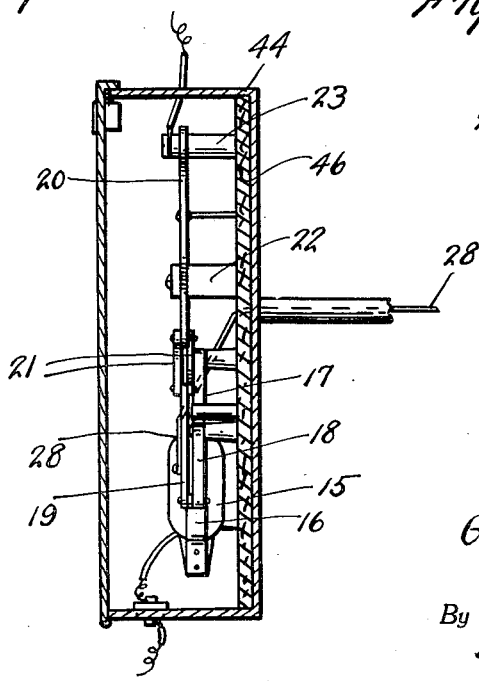
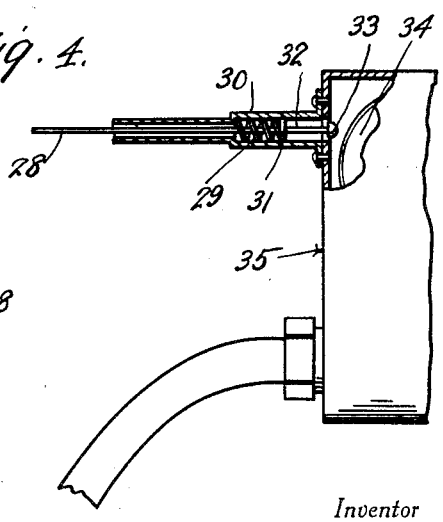
Inventor
Giovanni Mechetti
By Clarence A. O'Brien
Attorney Sept. 22, 1931.  G. MECHETTI  1,823,950
AUTOMATIC AUTOMOBILE CONTROL
Filed Jan. 31, 1930  3 Sheets-Sheet 3
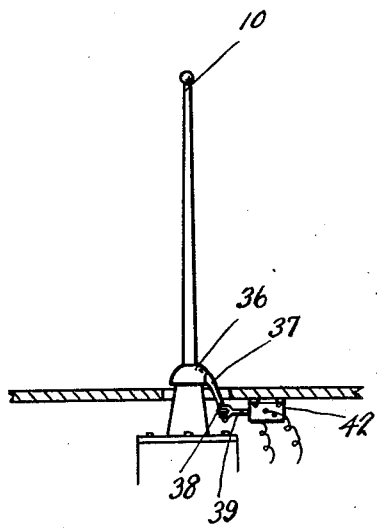
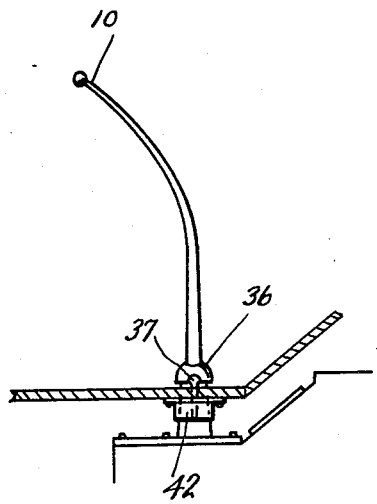
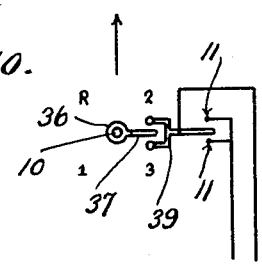
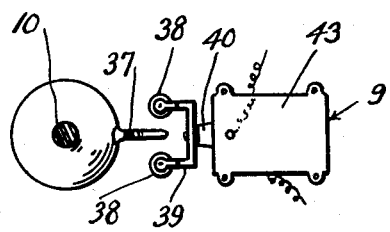
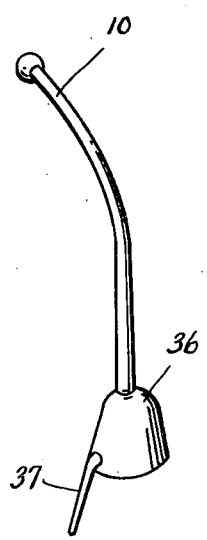
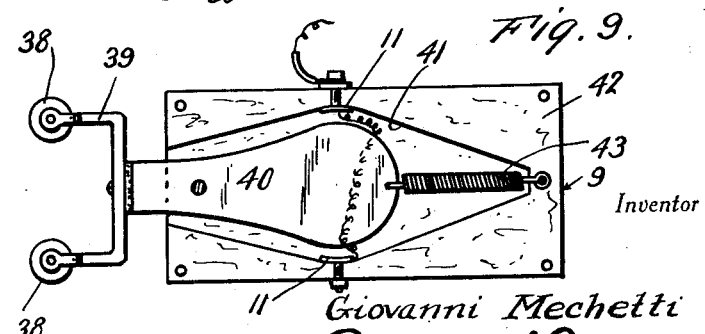
Inventor
Giovanni Mechetti
By Clarence A. O'Brien
Attorney Patented Sept. 22, 1931

1,823,950

UNITED STATES PATENT OFFICE

GIOVANNI MECHETTI, OF ROCHESTER, NEW YORK

AUTOMATIC AUTOMOBILE CONTROL

Application filed January 31, 1930. Serial No. 424,945.

This invention relates to new and useful improvements in means for automatically stopping an automobile when the same has been in an accident.

The principal object of this invention is to provide an automatic control for automobiles which in use will serve to shut off the power of the automobile without manual control.

Another important object of the invention is to provide an automatic control for automobiles which will not only shut off the automobile power, but which will also stop the speedometer with the indicating element, indicating the speed at which the vehicle was traveling at the time of the impact.

These and various other important objects and advantages of the invention will become more apparent to the reader after the invention becomes better understood from the following specification and claims.

In the drawings:—

Figure 1 represents a diagrammatic view disclosing the various elements of the system and the electrical connections between the same.

Fig. 2 represents a side elevational view of the magnetic switch mounted within the housing, the cover of which has been removed.

Fig. 3 is a vertical sectional view taken substantially on the line 3—3 of Fig. 2.

Fig. 4 is a fragmentary side elevational view of the speedometer and the means for retaining the same.

Fig. 5 is a front elevational view of the switch means associated with the gear shift.

Fig. 6 is a side elevational view of the switch means associated with the gear shift lever.

Fig. 7 is a top plan view of the switch means associated with the gear shift lever.

Fig. 8 represents a perspective view of the gear shift lever.

Fig. 9 represents a top plan view of the switch shown in Fig. 7, the same having its cover plate removed to disclose the internal parts thereof.

Fig. 10 represents a diagrammatic view disclosing the novel gear shift lever and the switch shown in Figs. 7 and 9.

Fig. 11 is a perspective sectional view disclosing the compressible contacting or circuit closing means which surrounds the automobile.

Referring to the drawings, wherein like reference numerals indicate like parts, it can be seen in Fig. 1, that numeral 5 represents the usual internal combustion engine of an automobile. Numeral 6 represents the usual battery, while numeral 7 is the ignition switch. One side of the battery 6 is grounded in the usual manner, while its opposite side is connected to the switch 7.

The opposite side of the switch 7 is connected to the distributor 8 and also to the switch generally referred to by the numeral 9, which is associated with the gear shift lever 10. This switch 9, is operated by the gear shift lever when the latter is moved to a gear-shifted position and is engageable with either of the two contacts 11—11, both of which are connected to the conductor 12, from which the positive branch contact strips 13 lead.

These positive branch strips 13 are disposed in opposed relation to the branch strips 14 which lead from one side of the electro-magnet 15. The opposite side of the electro-magnet is grounded in the manner shown in Fig. 1. The armature 16 is controlled by the magnet 15 and when attracted to the bell crank 17 to actuate the L-shaped arm 18. These strips 13 and 14 are secured to the inner side of the cushion bumper tube 14a in spaced relation to each other.

The lower end of this arm 18 is pivotally connected to a rod 19. This rod 19 is connected at its upper end to the pair of L-shaped switch plates 20—20 through the agency of pivotal links 21. The switch plates 20—20 are electrically connected at their fulcrum point through the agency of a connecting member 22.

Contacts 23—23 are normally in spaced relation with respect to the plates 20—20, and the foregoing switch including the contacts 23—23 is generally referred to by the numeral 24, and is shown more in detail in Fig. 2. One of these contacts 23 has a wire 25 leading therefrom, throughout a horn 26 to the distributor 8 while the other contact 23 is directly connected to the distributor 8 through the agency of the conductor 27.

When the rod 19 moves upwardly, the cable (see Fig. 1), 28 is released, and as shown in Fig. 4, the spring 29 located in the barrel 30 and bearing against the collar 31, projects the plunger 32 within the head 33 against the rotatable element 34 of the speedometer generally referred to by numeral 35 so as to stop the motion of the mechanism at the time of the collision before the same can begin to return to its normal position.

More specifically, it can be seen that the branches 13 are actually conductor strips, arranged within a cushion tube 14. This tube 14 is hollow and substantially triangular in cross section, and also has the branch element 14 arranged therein, in opposition to the positive branch 13. Obviously, when the reduced edge portion of the tube is projected through an impact sufficient to cause the element 14 to engage the element 13, the circuit will be completed, that is providing the switch 7 has been completely closed.

The current will flow from the battery 6 through the switch 7 and switch 9 through one of the contacts 11 and from there to the branch 13 and across to the branch 14 and from there to energize the magnets 15. This will result in the attraction of the armature 16 and the actuation of the switch 24, so as to not only ground the circuit, but also cause the energization of the horn 26, which will blow until shut off manually.

The gear shift lever 10, has the usual ball housing 36 at its lower end, and from this depends the arm 37. This arm 37 is operative between the rollers 38 on the ends of the U-shaped member 39. This U-shaped member 39 is secured and suitably insulated from the switch element 40 which is disposed within the pocket 41 of the fiber plate 42.

An upper fiber plate 43 is adapted to be secured to the lower plate 42 in overlying disposition with respect to the switch element 40 by suitable securing elements. The plate 42 carries the contacts 11—11 which are connected in the manner aforementioned to the positive branches 13. A coiled spring 43 serves to centralize the switch element 40 within the pocket 41 so that it normally remains in a position substantially spaced from both of the contacts 11—11, that is, when the gear shift lever is in neutral, first, or reverse position.

It can be further shown in Fig. 2 that the magnetic switch 24 is mounted within a housing 44. The switch plates 20—20 are contracted by the spring 45 when the rod 19 is thrown beyond the fulcrum point of the L-shaped rocker arm 18. It is preferable that the electro-magnet 15 has the other parts of the switch mounted on a di-electric panel 46 preferably secured to the housing 44.

It will thus be seen that when the branch elements 14 and 13 contact during a collison, the magnetic switch circuit will be completed for grounding the current supplied to the distributor 8 and furthermore to sound the horn 26 so that attention will be drawn to the scene.

While the foregoing description has been specific, it is to be understood that various changes in the shape, size, and materials may be resorted to without departing from the spirit and scope of the invention as claimed, hereinafter.

Having thus described my invention, what I claim as new is:—

1. In combination, an ignition system for automobiles, a magnetic switch circuit, said magnetic switch circuit being normally open, an emergency switch means whereby the said magnetic switch may be energized for grounding the ignition system, a speedometer, and means associated with the said magnet and switch whereby the speedometer may be stopped at the speed indication present at the time of the closing of the switch means.

2. In combination, an ignition system for automobiles, a magnetic switch circuit, said magnetic switch circuit being normally opened, an emergency switch means whereby the said magnetic switch may be energized for grounding the ignition system, a speedometer, said speedometer including a movable element, a swingable member operative by the said magnet, and an element interposed between the swingable member and the movable element of the speedometer to provide a stop for the movable element when the magnet is energized.

In testimony whereof I affix my signature.

GIOVANNI MECHETTI.